United States Patent [19]

Potter et al.

[11] Patent Number: 5,242,549

[45] Date of Patent: Sep. 7, 1993

[54] DISTILLATION SEPARATION PROCESS OF TITANIUM TETRACHLORIDE AND HALOHYDROCARBON

[75] Inventors: Michael W. Potter, Sugarland; Stephen W. Cowan, Tomball; Robert S. Tomaskovic, Houston, all of Tex.

[73] Assignee: Shell Oil Company, Houston, Tex.

[21] Appl. No.: 802,798

[22] Filed: Dec. 6, 1991

[51] Int. Cl.$^5$ ............... B01D 3/34; C01G 23/02; C07C 17/38

[52] U.S. Cl. .................................. 203/6; 203/67; 203/73; 203/78; 203/DIG. 19; 423/76; 423/492; 570/211

[58] Field of Search ............ 203/6, 71, 73, 78, 84, 203/67, DIG. 19, 69, 70; 423/76, 492; 570/211

[56] References Cited

U.S. PATENT DOCUMENTS

| | | | |
|---|---|---|---|
| 2,754,256 | 7/1956 | Stambaugh | 423/76 |
| 2,880,199 | 3/1959 | Jezl | 423/492 |
| 2,915,364 | 12/1959 | Clabaugh et al. | 423/76 |
| 2,958,574 | 11/1960 | Hansley et al. | 423/76 |
| 3,533,733 | 10/1970 | Clark et al. | 423/492 |
| 3,963,585 | 6/1976 | Winter et al. | 423/492 |
| 4,725,338 | 2/1988 | Asanuma et al. | 203/38 |
| 4,728,705 | 3/1988 | Nestlerode et al. | 526/125 |
| 4,914,257 | 4/1990 | Cohen et al. | 585/814 |

FOREIGN PATENT DOCUMENTS

| | | |
|---|---|---|
| 51-146386 | 12/1976 | Japan . |
| 53-132512 | 11/1978 | Japan . |
| 57-135807 | 8/1982 | Japan . |
| 61-266412A | 11/1986 | Japan . |
| 1310380A | 5/1987 | U.S.S.R. . |

*Primary Examiner*—Wilbur Bascomb, Jr.
*Attorney, Agent, or Firm*—Otto O. Meyers, III

[57] ABSTRACT

An improved process for separation of valuable components of a waste stream resulting from production of an olefin polymerization procatalyst by the addition to the waste stream of a separation solvent of intermediate boiling point, subjecting the resulting mixture to a first distillation zone to separate the desired waste stream components from the upper portion of the zone and passing the bottoms product to a second distillation zone wherein separation solvent is recovered from the upper portion of the zone for recycle and passing the bottoms product to disposal or further processing.

12 Claims, 1 Drawing Sheet

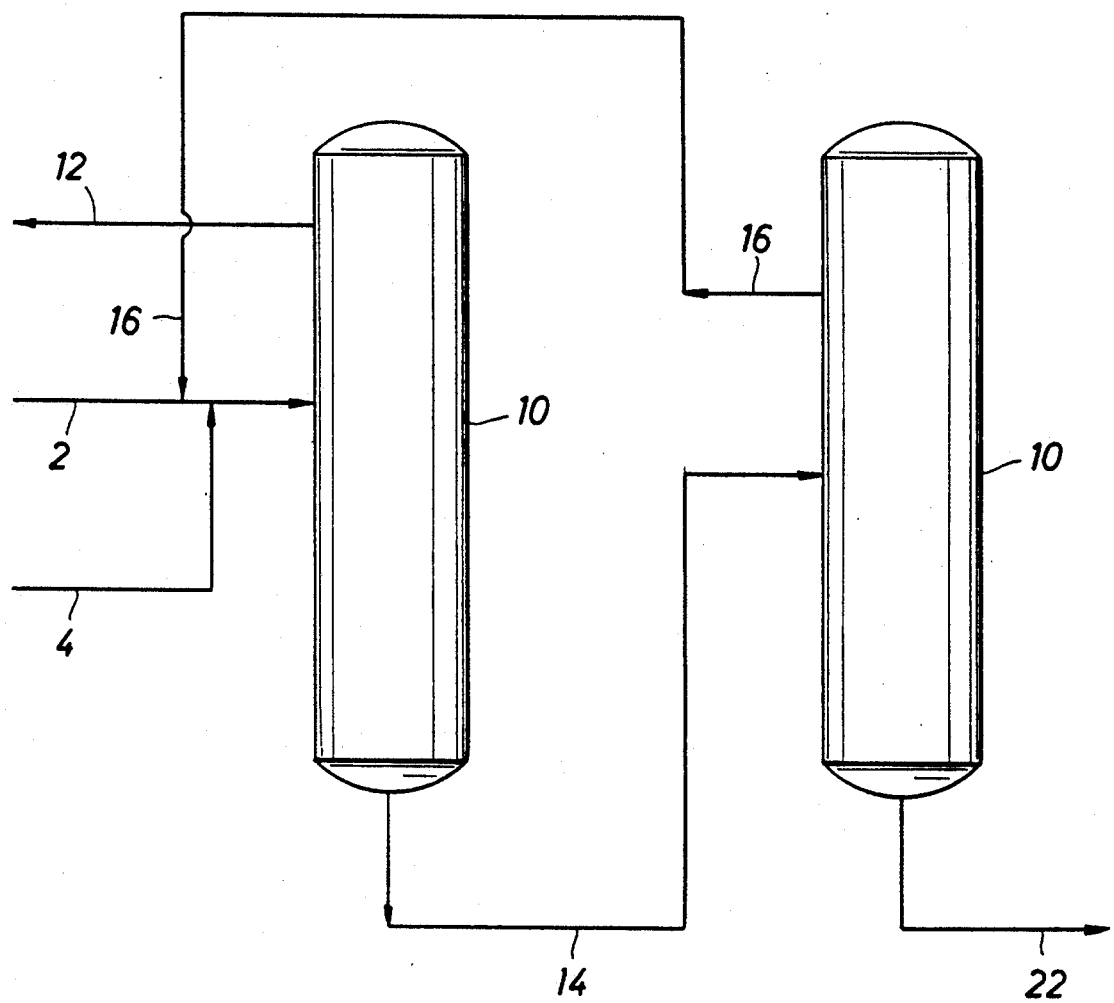

5,242,549

DISTILLATION SEPARATION PROCESS OF TITANIUM TETRACHLORIDE AND HALOHYDROCARBON

FIELD OF THE INVENTION

This invention relates to the separation and partial recovery of components of a complex mixture of organic compounds and inorganic compounds. More particularly, the invention relates to a process for the separation of mixtures of compounds resulting from the preparation of an olefin polymerization catalyst precursor.

BACKGROUND OF THE INVENTION

The polymerization of lower α-olefins to produce thermoplastic polymers is an industry of substantial commercial importance. The polymeric products of such a process, e.g., polypropylene, polyethylene and ethylene/propylene copolymers, are materials of commerce because of the relatively low cost of the polymers and the desirable properties they possess. The polymerization of ethylene is relatively uncomplicated because the polyethylene polymer exists in only one steric form. Higher α-olefins such as propylene form polymers of several steric types because of the pendant alkyl group of the olefin monomer. The cost and value of polypropylene, for example, will be greatly influenced by the steric form in which the polymer is produced. Most commercial polypropylene is crystalline and highly stereoregular and is usually isotactic. Polypropylene which is not stereoregular is termed atactic and is not crystalline. This amorphous polymer is less desirable and, if present in substantial quantities, must usually be removed as by extraction before the polypropylene will have commercially attractive properties. In recent commercial polypropylene production, it is virtually mandatory for economic reasons to employ polymerization catalyst which is highly stereoregular and sufficiently active so that polypropylene of acceptable properties will be produced without the need for extraction or deashing steps.

The production of such an active, stereoregular catalyst is frequently a rather complicated process with much of the complexity being encountered during the production of what is conventionally termed the olefin polymerization procatalyst. This catalyst precursor is frequently a titanium-containing solid and often contains moieties of magnesium and halide, particularly chloride. Such procatalysts are described in numerous patents and other references and vary in chemical character, depending upon the particular catalyst desired. On class of procatalyst results from the reaction of a magnesium compound, often a magnesium alkoxide compound, with a tetravalent titanium halide in the presence of a halohydrocarbon reaction diluent and an electron donor which is often an alkyl ester of an aromatic monocarboxylic or dicarboxylic acid.

One such procatalyst is described by Nestlerode et al, U.S. Pat. No. 4,728,705. The procatalyst of this reference is formed by producing a carbonated magnesium ethoxide and reacting this compound with tetravalent titanium halide, usually titanium tetrachloride, an aromatic halohydrocarbon such as chlorobenzene and an ester of varying type. Procatalysts are also produced in similar manner from magnesium ethoxide. Preferred esters for this type of procatalyst include alkyl benzoates such as ethyl benzoate and ethyl p-ethylbenzoate or alkyl phthalates such as diethyl phthalate or diisobutyl phthalate. The procatalyst is generally a solid material and is easily separated from the media of its production. The remaining waste product is a liquid material and contains at least some of unreacted titanium tetrachloride, halohydrocarbon, e.g., chlorobenzene, unreacted electron donor, and a wide array of titanium chloroalkoxide compounds or complexes thereof with other titanium chloroalkoxide compounds or aromatic esters.

This waste product from procatalyst production presents a substantial disposal problem which also adversely affects the economy of the polymerization process. It would be of advantage to be able to separate the components of such a waste stream and to recover for reuse the more valuable components of the product such as titanium tetrachloride and the halohydrocarbon reaction diluent.

SUMMARY OF THE INVENTION

The present invention provides a process for the separation of certain of the components of a waste stream resulting from production of a titanium-based olefin polymerization procatalyst. More particularly, the invention provides a process for the separation of titanium tetrachloride and halohydrocarbon reaction diluent such as chlorobenzene from mixtures thereof with titanium alkoxide, titanium chloroalkoxide and esters of aromatic acids. In a preferred embodiment, the amount of titanium tetrachloride recoverable by the separation process is greater than that quantity originally present in the mixture undergoing separation.

BRIEF DESCRIPTION OF THE DRAWING

The Figure depicts a separation scheme including a first distillation zone in which a portion of the components of a waste product stream resulting from procatalyst production are separated from added separation solvent and the remaining portion of the waste product. In a second distillation zone the separation solvent is separated from waste product components.

DESCRIPTION OF THE INVENTION

The process of the invention comprises the separation and recovery of titanium tetrachloride and halohydrocarbon reaction diluent, e.g., chlorobenzene, from mixtures with other titanium compounds, aromatic esters and complexes thereof. Although the process is broadly applicable to separation of such a mixture independent of its origin, the process is particularly applicable to the separation of a liquid waste product resulting from the production of titanium-containing, magnesium-containing, chloride-containing olefin polymerization procatalyst by contacting a magnesium alkoxide with titanium tetrachloride in the presence of chlorobenzene.

The mixture undergoing separation by the process of the invention is a complex mixture of titanium tetrachloride, titanium alkoxides and chloroalkoxides, particularly where the alkoxide is ethoxide, alkyl esters of aromatic acids and hydrocarbon reaction diluent. The mixture will also contain various complexes of titanium alkoxy compounds with other titanium alkoxy compounds or with the aromatic esters. The typical disposal of such a waste product poses environmental hazards and represents a considerable economic detriment to the overall olefin polymerization process. The recovery of titanium tetrachloride and halohydrocarbon diluent for reuse in olefin polymerization procatalyst production is of substantial economic benefit.

The atmospheric boiling point of the waste product components would suggest the suitability of simple distillation for separation of the waste product. At atmospheric pressure, titanium tetrachloride boils at 136° C. and chlorobenzene, for example, boils at 132° C. whereas the boiling points of the other product components are at about 185° C. or above. However, such distillation at atmospheric pressure results in formation of substantial amounts of solid material, particularly in distillation column reboilers, and one of the distillation products is the environmentally undesirable ethyl chloride. Distillation at 500 millibar gave the same results. If distillation at 50 mbar is employed, a useful separation is obtained but solids form upon cooling of the distillation bottoms. Without wishing to be bound by any particular theory, it appears likely that during such distillations of the waste product mixture a number of insoluble titanium chloroethoxide and aromatic ester complexes form which, as solid material, presents problems for the distillation process.

In the process of the invention, however, a separation solvent having a boiling point intermediate to the titanium tetrachloride and halohydrocarbon on one hand and the mixture of titanium ethoxy compounds, esters and complexes on the other, is added to the waste product. Distillation of this mixture results in separation of the titanium tetrachloride and halohydrocarbon from the other mixture components including the separation solvent without the formation of insoluble compounds. The separation solvent is then separated from the remaining mixture components in a second distillation step. The titanium tetrachloride and halohydrocarbon are suitably recycled for use in further olefin polymerization procatalyst and the separation solvent is suitably recycled to the first distillation for use in further separations.

It is apparent that during the overall separation process of the invention certain chemical transformations take place in addition to the separations. It is known, for example, from Field et al, "The Organic Chemistry of Titanium", pages 51–54, Butterworths, London (1965), that during vacuum distillation of titanium trichlorobutoxide, the titanium trichlorobutoxide undergoes apparent disproportionation to produce titanium dichlorodibutoxide and titanium tetrachloride. Some analogous process apparently takes place during the present separation process and the proportion of titanium tetrachloride obtainable by the present process is generally greater than that present in the initial waste product undergoing separation. At the same time, the proportion of higher titanium alkoxides in the mixture undergoing separation also increases which apparently decreases the tendency of the mixture to form insoluble complexes of titanium chloroalkoxy compounds.

The process of the invention, in the preferred embodiment, comprises the addition of a separation solvent of intermediate atmospheric boiling point, preferably from about 140° C. to about 180° C., to a product mixture comprising titanium tetrachloride, chlorobenzene, and at least some of titanium tetraalkoxide, titanium chloroalkoxide compounds, esters of aromatic esters and complexes thereof. The process is applied to misctures containing a variety of alkoxide moieties, each alkoxide containing up to 4 carbon atoms inclusive. Most commonly, however, each alkoxide of the mixture to be separated is ethoxide. The resulting mixture including separation solvent is passed to a first distillation zone wherein distillation at reduced pressure produces a distillate containing predominantly titanium tetrachloride and chlorobenzene and a bottoms product comprising the remainder of the mixture including separator solvent. The bottoms product is passed to a second distillation zone, also operating at reduced pressure, where separation solvent is recovered from the top of the zone. The bottoms product form the second distillation zone is removed and ultimately passes to waste disposal or further processing.

A variety of separation solvents are useful in the separation process provided that the atmospheric boiling point of the separation solvent is higher than that of the TiCl$_4$ and the solvent to be recovered but lower than the lowest boiling of the titanium chloroalkoxides and which provide sufficient solubility to the components of the mixture undergoing separation to maintain those components or reaction products thereof in solution. Such solvents could include aliphatic solvents, but preferred separation solvents are aromatic solvents including dichlorobenzenes and chlorotoluenes. Particularly preferred as separation solvent is ortho-chlorotoluene.

The quantity of separation solvent to be supplied to the waste product mixture to be separated is not critical. A quantity of separation solvent approximately equal in volume to the waste product, e.g., from about half the waste product volume to about twice the waste product volume, is satisfactory. The first distillation zone is operated at reduced pressure in order to reduce the temperature of the distillation. Typical distillation pressures are from about 50 mbar to about 200 mbar. At such pressures, the titanium tetrachloride/chlorobenzene is removed from the upper portion of the distillation zone at temperatures on the order of from about 120° F. to about 160° F. and the lower portion of the zone will also be maintained from about 180° F. to about 220° F. The titanium tetrachloride/chlorobenzene mixture is recovered from the top of the distillation zone. This mixture is then available for further use in the production of olefin polymerization procatalyst.

The bottoms product of the first distillation zone is passed to a second distillation zone operating at pressures from about 50 mbar to about 200 mbar and within a temperature range of from about 120° F. to about 180° F. at the top of the column and from about 180° F. to about 240° F. at the bottom of the column. The separation solvent is obtained from the top of the distillation zone and, if desired, is passed to the first distillation zone, together with any necessary make-up separation solvent, for use in further separations. The bottoms product of the second distillation zone comprising largely higher titanium alkoxides and esters of aromatic acids is removed and directly or indirectly sent to disposal.

DESCRIPTION OF THE FIGURE

The Figure depicts a first distillation zone 10 which is shown as a single column but could alternatively be multiple columns. A suitable column is a packed column of from 2 to 4 sections, each of which has multiple stages. Other types of conventional reduced pressure, multiple stage columns are also suitable. Typical operation of the zone is at about 100 mbar with a temperature varying from about 130° F. at the top of the zone to about 200° F. at the bottom. Entering the column 10 via line 2 is a waste product stream illustratively obtained from olefin polymerization procatalyst production facilities (not shown) which contains titanium tetrachloride, chlorobenzene, tetravalent titanium chloroethoxy compounds, organic esters, e.g., ethyl benzoate or diisobutyl phthalate, and complexes of the titanium chloroethoxy compounds with other titanium chloroethoxides or organic esters. Separation solvent chlorotoluene is provided during operation by recycle line 16 from the second distillation zone 20 and/or by make-up chlorotoluene introduced through line 4. A mixture of titanium tetrachloride and chlorobenzene is obtained from the upper portion of column 10 by line 12. This mixture is returned to atmospheric pressure and is suitable for use in the procatalyst production facilities. The bottoms product of column 10 is removed by line 14 and passed to a second distillation zone 20 which is also depicted as a single column although multiple columns would also be satisfactory. Column 20 is suitably a two-section column with multiple stages in the upper section and in the lower section. Other forms of multiple stage columns are also useful. From the top of column 20 is withdrawn separation solvent chlorotoluene via line 16 and is recycled to the first distillation column 10. The bottoms product of column 20 comprising separation solvent, organic esters and a mixture of titanium chloroalkoxides removed by line 22 and is passed directly or indirectly to disposal. Typical operation of column 20 will be at a pressure of about 100 mbar with a temperature in the upper portion of the column of about 160° F. and a temperature of about 220° F. in the lower portion.

It should be appreciated that the Figure and the accompanying discussion depict a simplified processing scheme and in actual operation the process will employ pumps, reboilers, rectifiers and/or other mechanical features as will be apparent to one skilled in this art.

The overall separation process of the present invention provides an efficient method of separating titanium tetrachloride and chlorobenzene from the other components of a waste product resulting from production of an olefin polymerization procatalyst by one or more known methods. The process provides for such separation by a multiple distillation scheme without the formation of solid complexes normally obtained during distillation of such waste product. Moreover, because of chemical conversions of the titanium-containing components of the waste product during distillation, more titanium tetrachloride is typically obtained by operation of the process than is present in the waste product fed to the process. The process of the invention therefore significantly provides for more economical operation of the production of certain types of olefin procatalyst as well as the process of producing olefin polymerization catalyst and the polymerization process which employs that catalyst.

What is claimed is:

1. A process for the separation of titanium tetrachloride and halohydrocarbon from a mixture thereof with at least one of titanium tetraalkoxide, tetravalent titanium chloroalkoxy compounds, alkyl esters of aromatic carboxylic acids and complexes thereof by adding to the mixture a separation solvent of boiling point intermediate to (1) the titanium tetrachloride and halohydrocarbon and (2) the remaining mixture components, passing the resulting mixture to a first distillation zone from which a mixture of titanium tetrachloride and halohydrocarbon is obtained from the upper portion of the zone, passing the bottoms product of the first distillation zone to a second distillation zone wherein separation solvent is obtained from the upper portion of the zone and bottoms product is removed from the lower portion of the zone.

2. The process of claim 1 wherein each distillation zone operates at reduced pressure.

3. The process of claim 2 wherein each alkoxide of said titanium tetraalkoxide is an alkoxide of up to 4 carbon atoms inclusive.

4. The process of claim 3 wherein the halohydrocarbon is chlorobenzene.

5. The process of claim 4 wherein the separation solvent is dichlorobenzene or chlorotoluene.

6. The process of claim 5 wherein separation solvent from the second distillation zone is returned to the first distillation zone.

7. The process of claim 6 wherein the first distillation zone operates at a pressure from about 50 mbar to about 200 mbar and in a temperature range from about 120° F. to about 160° F. at the top of the zone to from about 180° F. to about 220° F. at the bottom of the zone.

8. The process of claim 7 wherein the second distillation zone operates at a pressure from about 50 mbar to about 200 mbar and within a temperature range of from about 120° F. to about 180° F. at the top of the column and from about 180° F. to about 240° F. at the bottom of the column.

9. The process of claim 8 wherein alkoxide of said titanium tetraalkoxide is ethoxide.

10. The process of claim 9 wherein the separation solvent is dichlorobenzene.

11. The process of claim 9 wherein the separation solvent is ortho-chlorotoluene.

12. The process of claim 9 wherein the amount of titanium tetrachloride separated in the first distillation zone is greater than the amount of titanium tetrachloride present in the mixture which is passed to said first distillation zone.

* * * * *